United States Patent
Jin et al.

(10) Patent No.: US 10,061,446 B2
(45) Date of Patent: Aug. 28, 2018

(54) TOUCH PANEL USING TOUCH PEN AND FORMED WITH POWER PATTERN

(71) Applicant: LG INNOTEK CO., LTD., Seoul (KR)

(72) Inventors: Kwang Yong Jin, Seoul (KR); Seongsu Oem, Seoul (KR); Young Sun You, Seoul (KR); Sun Hwa Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 22 days.

(21) Appl. No.: 14/741,726

(22) Filed: Jun. 17, 2015

(65) Prior Publication Data
US 2015/0370347 A1 Dec. 24, 2015

(30) Foreign Application Priority Data
Jun. 19, 2014 (KR) .................... 10-2014-0074858

(51) Int. Cl.
*G06F 3/044* (2006.01)
*G06F 3/041* (2006.01)

(52) U.S. Cl.
CPC .............. *G06F 3/044* (2013.01); *G06F 3/041* (2013.01); *G06F 2203/04103* (2013.01); *G06F 2203/04106* (2013.01); *G06F 2203/04107* (2013.01); *G06F 2203/04112* (2013.01)

(58) Field of Classification Search
CPC .......................................... G06F 3/041–3/048
See application file for complete search history.

(56) References Cited

U.S. PATENT DOCUMENTS

| | | | | |
|---|---|---|---|---|
| 8,085,250 B2 * | 12/2011 | Reynolds | ............ | G06F 3/03547 178/18.01 |
| 9,098,131 B2 * | 8/2015 | Jeong | ...................... | G06F 3/044 |
| 9,125,330 B2 * | 9/2015 | Su | ............................ | H05K 1/11 |
| 9,201,554 B2 * | 12/2015 | Lee | ........................ | G06F 3/045 |
| 9,377,891 B2 * | 6/2016 | Yang | ...................... | G06F 3/0416 |
| 9,386,731 B2 * | 7/2016 | Robertson | ............ | H05K 9/0075 |
| 2005/0237439 A1* | 10/2005 | Mai | ........................ | G06F 3/045 349/12 |
| 2008/0227308 A1* | 9/2008 | Fujii | ...................... | G06F 3/0416 439/66 |
| 2008/0246744 A1* | 10/2008 | Park | ...................... | G06F 3/0416 345/173 |
| 2011/0157762 A1* | 6/2011 | Kurashima | ............. | G06F 3/044 361/277 |

(Continued)

FOREIGN PATENT DOCUMENTS

| | | | | |
|---|---|---|---|---|
| GB | 2469209 A | * | 10/2010 | ....... G06K 19/07749 |
| KR | 10-2013-0108929 A | | 10/2013 | |

*Primary Examiner* — Patrick F Marinelli
(74) *Attorney, Agent, or Firm* — KED & Associates, LLP

(57) ABSTRACT

A touch panel is provided with a power pattern. The touch panel may include a first substrate, a first pad and a second pad. The power pattern may be formed as the first substrate to surround an edge of one side of the substrate at least one or more times and not to be overlapped all the way from one end to the other end. The first pad may be electrically connected to one end of the power pattern. The second pad may be electrically connected to the other end of the power pattern. The touch panel may also include a second substrate for arranging a terminal unit electrically connected to the first pad and the second pad.

11 Claims, 8 Drawing Sheets

(56) References Cited

U.S. PATENT DOCUMENTS

| | | | |
|---|---|---|---|
| 2011/0169770 A1* | 7/2011 | Mishina | G06F 1/1656 345/174 |
| 2011/0261003 A1* | 10/2011 | Lee | G02F 1/13338 345/174 |
| 2011/0315536 A1* | 12/2011 | Chiou | G06F 3/043 200/600 |
| 2012/0032914 A1* | 2/2012 | Kim | G06F 3/044 345/174 |
| 2012/0098784 A1* | 4/2012 | Kim | G06F 3/044 345/174 |
| 2012/0133597 A1* | 5/2012 | Chen | G06F 3/044 345/173 |
| 2012/0146919 A1* | 6/2012 | Kim | G06F 3/044 345/173 |
| 2012/0299863 A1* | 11/2012 | Yilmaz | G06K 19/07758 345/174 |
| 2012/0306824 A1* | 12/2012 | Horie | G06F 3/03545 345/179 |
| 2013/0043081 A1* | 2/2013 | Chen | G06F 3/044 178/18.05 |
| 2013/0062179 A1* | 3/2013 | Ye | G06F 3/041 200/512 |
| 2013/0229065 A1* | 9/2013 | Robertson | H05K 9/0075 307/104 |
| 2013/0342476 A1* | 12/2013 | Lee | G06F 3/041 345/173 |
| 2014/0001966 A1* | 1/2014 | Cho | H05B 37/00 315/161 |
| 2014/0028582 A1* | 1/2014 | Choi | G06F 3/041 345/173 |
| 2014/0049505 A1* | 2/2014 | Radivojevic | G06F 3/04883 345/174 |
| 2014/0132529 A1* | 5/2014 | Jeong | G06F 3/044 345/173 |
| 2014/0138141 A1* | 5/2014 | Li | H05K 1/0259 174/261 |
| 2014/0160708 A1* | 6/2014 | Chu | H01L 23/49838 361/767 |
| 2014/0184950 A1* | 7/2014 | Chu | G06F 3/0416 349/12 |
| 2014/0184951 A1* | 7/2014 | Yeh | G06F 3/044 349/12 |
| 2014/0184952 A1* | 7/2014 | Chu | G06F 3/044 349/12 |
| 2015/0015800 A1* | 1/2015 | Yang | G06F 3/0416 349/12 |
| 2015/0077649 A1* | 3/2015 | Lee | G06F 3/044 349/12 |
| 2015/0077652 A1* | 3/2015 | Lee | G06F 3/044 349/12 |
| 2015/0242029 A1* | 8/2015 | Kim | G06F 3/044 345/173 |
| 2015/0277634 A1* | 10/2015 | Oem | G06F 3/044 345/173 |
| 2015/0277643 A1* | 10/2015 | Kim | G06F 1/1626 345/173 |
| 2015/0293634 A1* | 10/2015 | Her | G06F 3/044 345/174 |
| 2015/0370347 A1* | 12/2015 | Jin | G06F 1/16 345/173 |
| 2016/0064814 A1* | 3/2016 | Jang | H01Q 1/526 343/842 |
| 2016/0070389 A1* | 3/2016 | Lee | G06F 3/044 345/174 |
| 2016/0098143 A1* | 4/2016 | Kida | G06F 3/041 345/174 |
| 2016/0274701 A1* | 9/2016 | Lee | G06F 3/044 |
| 2017/0123569 A1* | 5/2017 | Kim | G06F 3/044 |
| 2017/0139525 A1* | 5/2017 | Jo | G06F 3/0412 |

* cited by examiner

[Fig.1]
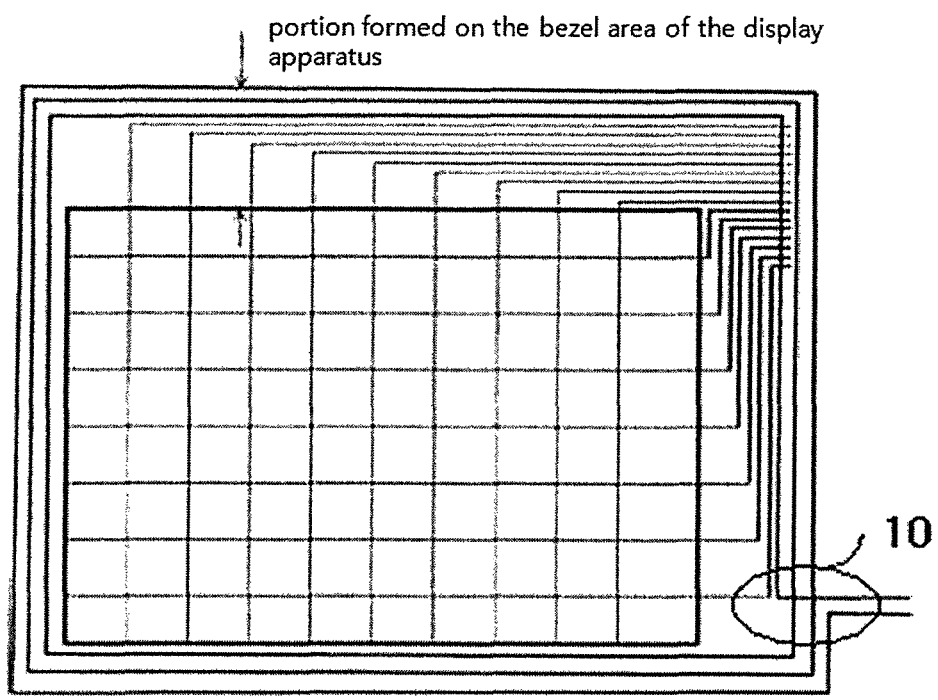

[Fig.2]
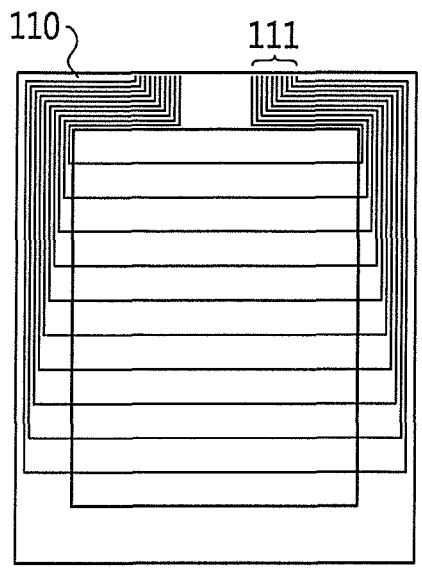
(a)
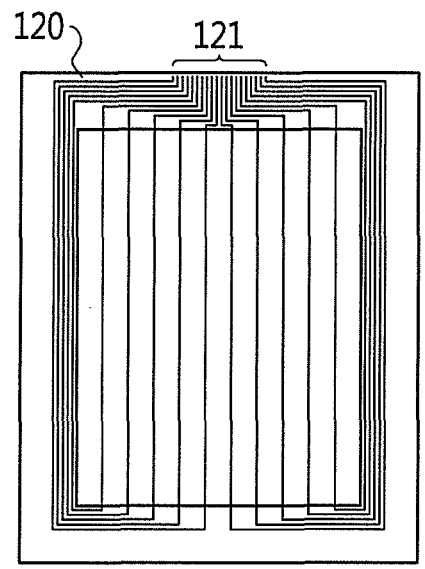
(b)
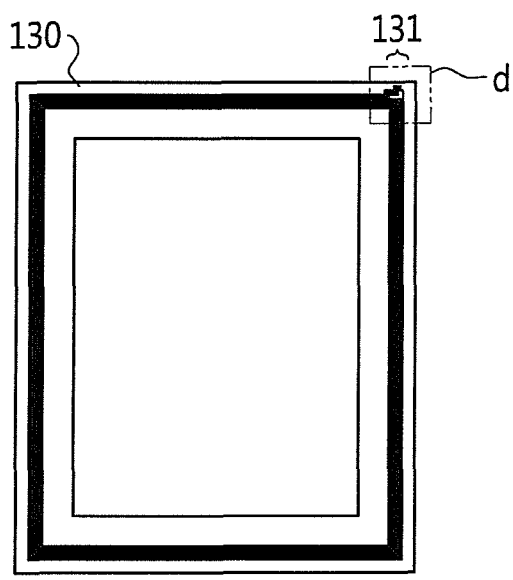
(c)

[Fig.3]
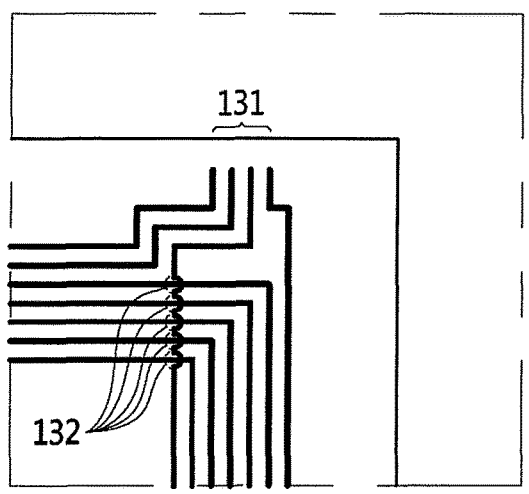
[Fig.4]
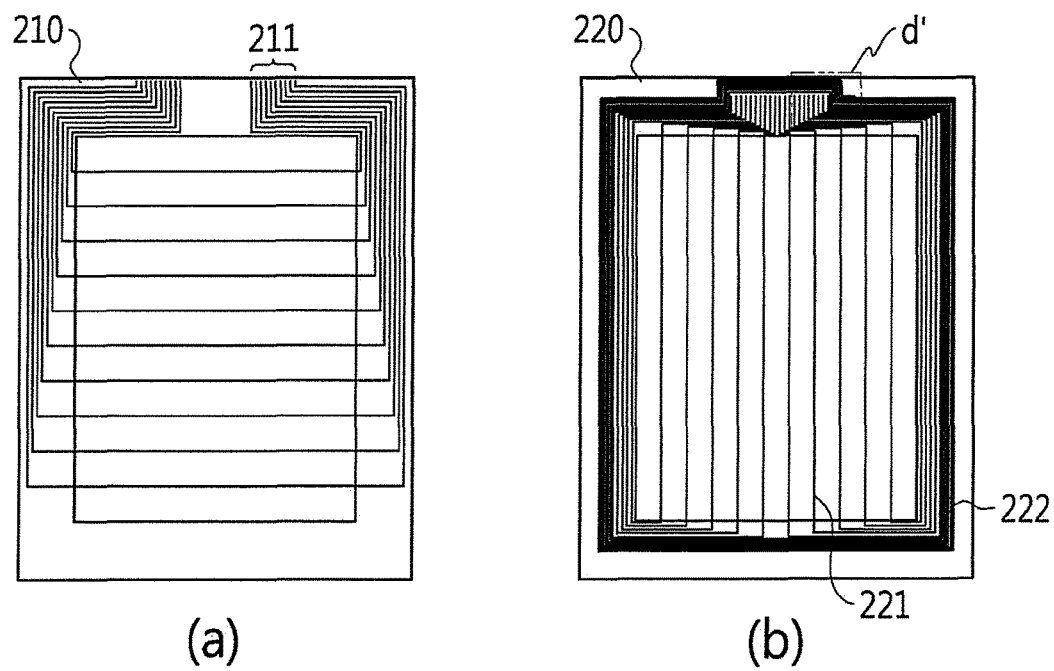

[Fig.5]
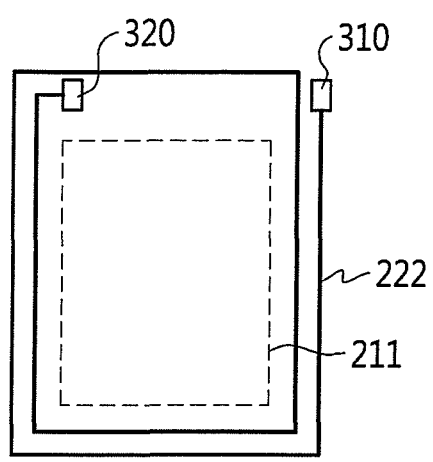
(a)
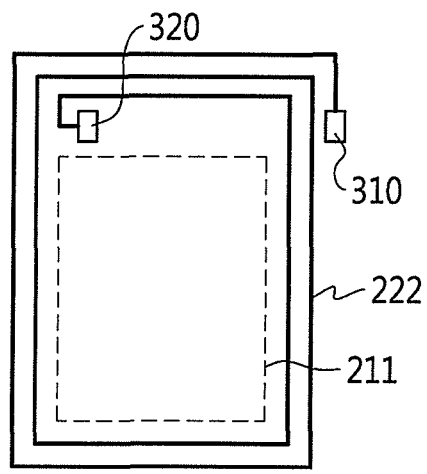
(b)
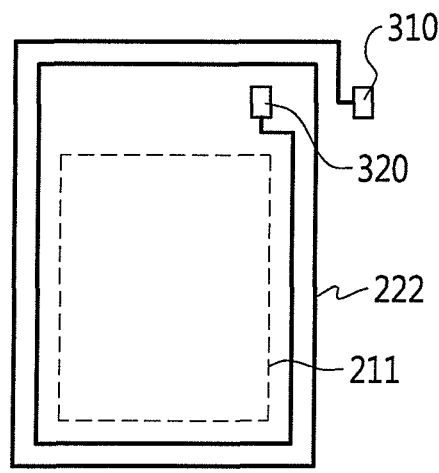
(c)

[Fig.6]
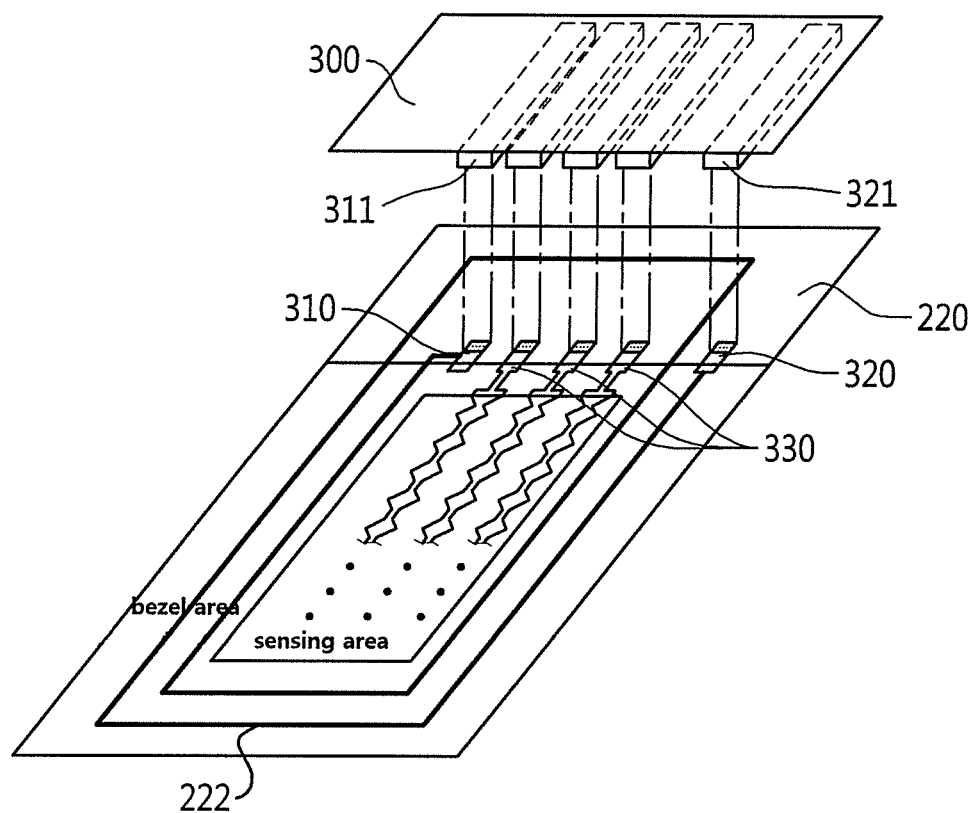

[Fig.7]
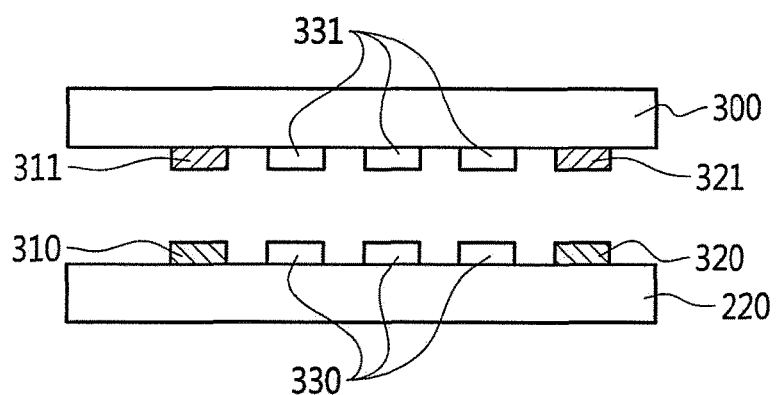
[Fig.8]
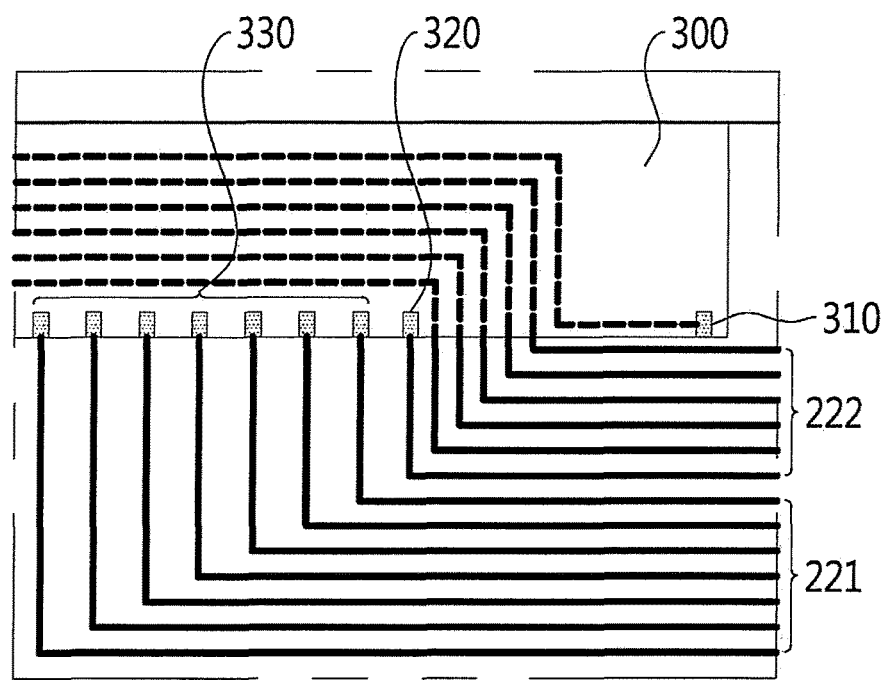

[Fig.9]
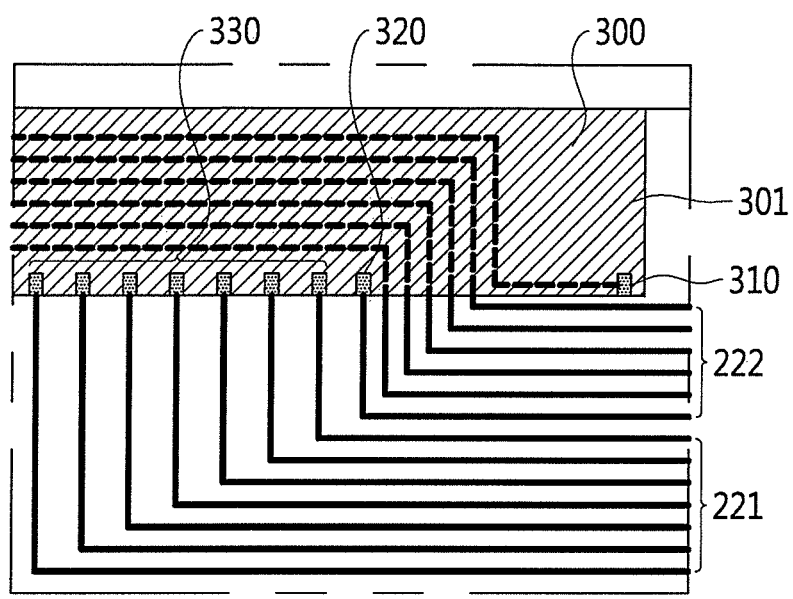

[Fig.10]
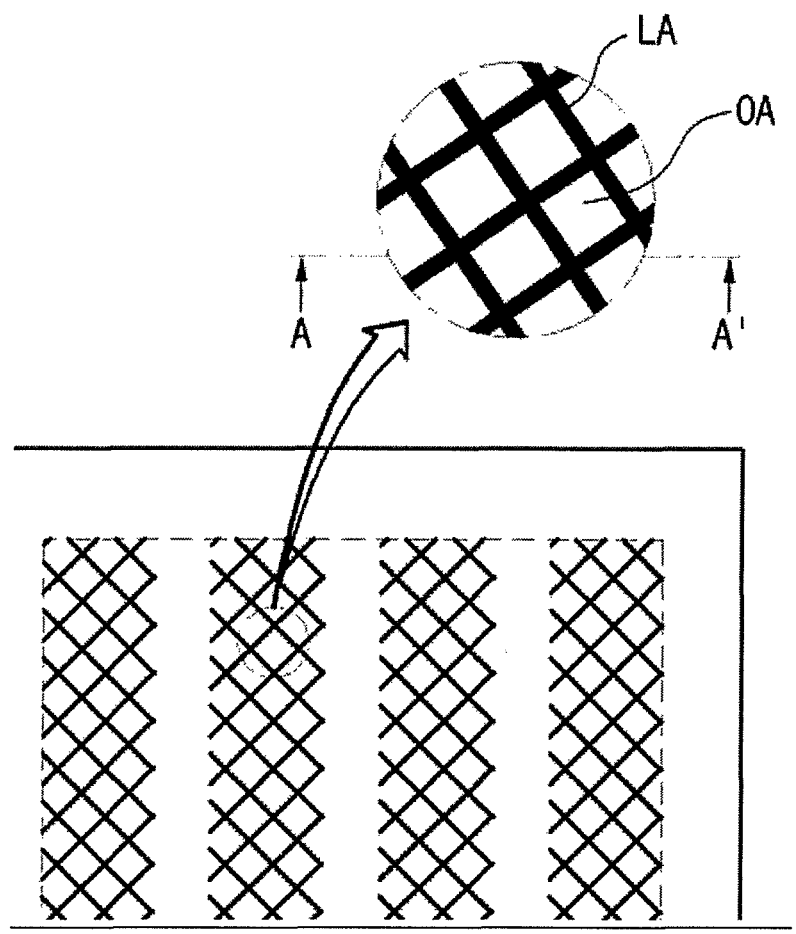

TOUCH PANEL USING TOUCH PEN AND FORMED WITH POWER PATTERN

CROSS-REFERENCE TO RELATED APPLICATIONS

This application claims priority under 35 U.S.C. § 119 to Korean Application No. 10-2014-0074858, filed Jun. 19, 2014, the subject matter of which is hereby incorporated by reference.

BACKGROUND

1. Field

Embodiments may relate to a touch panel, and more particularly, to an apparatus having a touch panel (using a touch pen) and a coil pattern formed on the touch panel to generate electromagnetic force in the touch pen.

2. Background

A touch panel is a panel that can control a device by directly pressing a position where a sentence, a picture or the like is displayed in combination with a CRT, an LCD or the like. Input methods of the touch panel may be classified as a resistive method, a capacitive method, an electromagnetic resonance method (and/or an electromagnetic method) and/or the like according to a method of detecting a position directed by a user.

The resistive method senses a position pressed by a pressure based on change of current amounts while DC voltage is applied, which is a method of sensing contact of two thin conductive layers on a screen by a pressure applied using a finger or an electronic pen (such as a stylus pen). The capacitive method senses the position by using capacitance coupling while AC voltage is applied, in which a target of the sensing should be a conductor, and a contact area of a predetermined size or larger is needed to make a change in capacitance that can be sensed.

The electromagnetic resonance method may use a substrate configured of an array of loop coils. Therefore, if a user moves a touch pen, the touch pen is driven by an AC signal to generate a resonating magnetic field, and the resonating magnetic field induces a signal in the loop coils. The position of the touch pen is detected through the signal induced in the loop coils.

A power coil may be provided around the loop coils so the touch pen may generate the resonating magnetic field. The touch pen may receive AC power from the power coil so the touch pen may generate electromagnetic force. Such a power coil may be formed in a sensing area of an electronic pen (i.e., at an edge of the loop coils), and a number of turns of the power coil should be increased to deliver more induced electromagnetic force to the electronic pen in a short period of time. Since the power coil should receive AC current that pulsates at a resonance frequency of a resonance circuit embedded in the electronic pen from a power supply driver (PWD), the power coil should be electrically connected to the power supply driver (PWD).

Korean Patent Registration No. 10-1355940, the subject matter of which is incorporated by reference, discloses a power coil in a sensing area of an electronic pen. FIG. 1 is a plan view showing a power pattern according to an arrangement. As shown in FIG. 1, in the power coil, some portions of the power coil may overlap to connect a start point and an end point of the power coil to input terminals of the power supply driver (PWD), and a jumping structure 10 may be provided to insulate the overlapped portions of the power coil.

There may be a problem in that forming an insulation unit is additionally configured, other than the forming of the power coil, in order to form such a jumping structure 10. Further, there may be a problem in that a manufacturing time and a manufacturing cost are increased since the manufacturing process is increased.

SUMMARY OF THE DISCLOSURE

Embodiments may be provided in view of the above problems, and it may be an object to improve problems of overlapping a power coil in forming the power coil.

Another object may be to reduce manufacturing time and manufacturing cost for forming the power coil.

To accomplish the above objects, according to one aspect, there is provided a touch panel (using a touch pen) and formed with a power pattern. The touch panel may include a first substrate on which the power pattern formed to surround an edge of one side of the substrate at least one or more times and not to be overlapped all the way from one end to the other end is arranged and a first pad electrically connected to one end of the power pattern and a second pad electrically connected to the other end of the power pattern are formed; and a second substrate on which a terminal unit electrically connected to the first pad and the second pad is arranged.

The second substrate may be an FPCB substrate, and one side of the first substrate may be bonded to the other side of the second substrate while facing each other.

The terminal unit, on the second substrate, may be exposed on the other side of the second substrate, and may be bonded to the first pad and the second pad.

The bonding may be Anisotropic Conductive Film (ACF) bonding.

A wiring pattern may be on the first substrate, and the power pattern may surround the wiring pattern.

The first substrate may be further provided with a third pad in addition to the first pad and the second pad, and the third pad may be electrically connected to one side of the wiring pattern.

The first pad, the second pad and the third pad may be provided along a straight line.

The other side of the first substrate may be bonded to one side of a third substrate, on which a wiring pattern is formed, while facing each other.

A material of the power pattern may be a metallic oxide, such as Indium Tin Oxide (ITO), Indium Zinc Oxide (IZO), Zinc Oxide (ZnO), Copper Oxide, Tin Oxide, Zinc Oxide, Titanium Oxide or the like, a nano-wire, a photosensitive nano-wire film, a carbon nano-tube (CNT), conductive polymer, graphene, copper (Cu), gold (Au), silver (Ag), aluminum (Al), titanium (Ti), or nickel (Ni).

A touch panel according to an embodiment may include: a first substrate on which the power pattern is formed at an edge of one side of the substrate; a second substrate on which terminal units electrically connected to the power pattern are arranged; and a substrate overlapping area in which the first substrate and the second substrate are overlapped, in which some of the power pattern may be formed in the substrate overlapping area.

The second substrate may be an FPCB substrate, and one side of the first substrate may be bonded to the other side of the second substrate while facing each other.

The first substrate may have a first pad electrically connected to a first end of the power pattern and a second pad electrically connected to a second end of the power pattern.

The terminal units arranged on the second substrate may be exposed on the other side of the second substrate, and may be bonded to the first pad and the second pad.

A wiring pattern may be formed on the first substrate, and the power pattern may surround the wiring pattern.

A material of the power pattern may be metallic oxide, such as Indium Tin Oxide (ITO), Indium Zinc Oxide (IZO), Zinc Oxide (ZnO), Copper Oxide, Tin Oxide, Zinc Oxide, Titanium Oxide or the like, a nano-wire, a photosensitive nano-wire film, a carbon nano-tube (CNT), conductive polymer, graphene, copper (Cu), gold (Au), silver (Ag), aluminum (Al), titanium (Ti), or nickel (Ni).

BRIEF DESCRIPTION OF THE DRAWINGS

Embodiments may be described in detail with reference to the following drawings in which like reference numerals refer to like elements and wherein:

FIG. 1 is a circuit diagram showing circuits of a touch panel according to an arrangement;

FIG. 2 is a circuit diagram showing circuits of substrates of a touch panel according to an arrangement;

FIG. 3 is a circuit diagram showing a power pattern according to an arrangement;

FIG. 4 is a circuit diagram showing circuits of substrates of a touch panel according to an example embodiment;

FIG. 5 is a circuit diagram schematically showing a power pattern according to an example embodiment;

FIG. 6 is a perspective view schematically showing a first substrate and a second substrate according to an example embodiment;

FIG. 7 is a side view showing the first substrate and the second substrate according to an example embodiment;

FIG. 8 is a circuit diagram showing a power pattern according to an example embodiment;

FIG. 9 is a circuit diagram showing a substrate overlapping area of a touch panel according to an example embodiment; and FIG. 10 is a view showing a pattern structure of a mesh shape.

DETAILED DESCRIPTION

Details of the present disclosure may be more clearly understood by the detailed description described below.

In describing embodiments, the meaning of forming a layer (film), an area, a pattern or a structure "on" or "under" a substrate, a layer (film), an area, a pad or a pattern includes forming directly on the substrate, the layer (film), the area, the pad or the pattern or forming with intervention of another layer. A reference of "on" or "under" each layer is described based on the drawings.

FIG. 2 is a circuit diagram showing circuits of substrates of a touch panel according to an arrangement. FIG. 3 is a circuit diagram showing a power pattern according to an arrangement. FIG. 2(a) shows an X layer substrate 110, FIG. 2(b) shows a Y layer substrate 120, and FIG. 2(c) shows a power coil layer substrate 130.

A touch panel (for use with a touch pen) may be provided with the X layer substrate 110 in which a pattern is formed in one direction to form a sensing area of the touch pen and the Y layer substrate 120 in which a pattern is formed in a direction perpendicular to the pattern of the X layer substrate 110. Additionally, the power coil layer substrate 130 may be provided to supply electromagnetic force to the touch pen, and a power pattern 131 (or power coil) may be formed on the power coil layer substrate 130 at an edge of the patterns formed on the X layer substrate 110 and the Y layer substrate 120 to surround the patterns at least one or more times when the X layer substrate 110, the Y layer substrate 120 and the power coil layer substrate 130 are stacked.

The power pattern 131 may start from one end and may be formed at the edge of the patterns formed on the X layer substrate 110 and the Y layer substrate 120. A first end and a second end of the power pattern 131 should be electrically connected to pads provided at one side of the power pattern 131. As shown in FIG. 3, contact points are created in the power pattern 131 to electrically connect the ends of the power pattern 131 to the pads, and these contact points are formed as a jumping structure 132 so as to be electrically insulated. Since bridges or via-holes are needed to form these contact points as the jumping structure 132, an additional process may be generated.

FIG. 4 is a circuit diagram showing a circuit of a substrate of a touch panel according to an example embodiment. FIG. 5 is a circuit diagram showing a power pattern (or power coil) according to an example embodiment. FIG. 6 is a perspective view schematically showing a first substrate and a second substrate according to an example embodiment. Other embodiments and configurations may also be provided. As shown in FIGS. 4 to 6, embodiments may relate to a touch panel having a power pattern 222 (or power coil) formed without the jumping structure 132 of the power pattern 131 of the arrangement described above.

According to FIGS. 4 to 6, the touch panel may include a first substrate 220, a second substrate 300, a third substrate 210, a first pad 310 and a second pad 320. The first substrate 220 may have the power pattern 222 formed to surround the edge of one side of the substrate at least one or more times and not to be overlapped all the way from one end to the other end. The first pad 310 may be electrically connected to one end of the power pattern 222. The second pad 320 may be electrically connected to the other end of the power pattern 222. The second substrate 300 may have a terminal unit 311 electrically connected to the first pad 310 and the second pad 320. The third substrate 210 may have a wiring pattern 211 in a direction perpendicular to the wiring pattern 210 (→221) formed on the first substrate 220.

The wiring pattern 221 discussed in this disclosure may include every kind of electrode patterned on the substrate. The wiring pattern 221 may include i) a sensing pattern or capacitive sensing pattern formed on the sensing area, and ii) conducting wires connected to the sensing pattern or capacitive sensing pattern formed on the bezel area.

The second substrate 300 may be an FPCB substrate, and when a side of the first substrate 220 on which the power pattern 222 is formed is referred to as one side, the one side of the first substrate 220 is bonded to the other side of the second substrate 300 while facing each other. A wiring pattern 221 may be formed on the first substrate 220, and the power pattern 222 may be formed to surround the wiring pattern 221. When one side of the first substrate 220 and the other side of the second substrate 300 are bonded to each other, an Anisotropic Conductive Film (ACF) may be used for attaching a film substrate to another film substrate. Additionally, the power pattern 222 and the wiring pattern 221 may be formed by a deposition method, a screen printing method, a photoresist method and/or the like.

In the touch panel, when the wiring pattern 221 is formed on the first substrate 220, the power pattern 222 is formed to surround the wiring pattern 221 at least one or more times while wrapping the wiring pattern 221. When the power pattern 222 starts from one side between an outermost pattern of the wiring pattern 221 and the substrate, the power pattern 222 is formed to surround the wiring pattern 221 at least one or more times while wrapping the wiring pattern 221, and the power pattern 222 is connected as one line and formed without a cut up to the other end (i.e., an end point).

A first end of the power pattern 222 may be connected to the first pad 210, and a second end is connected to the second pad 320. The first pad 310 and the second pad 320 are formed wider than the power pattern 222 and respectively connected to the first end and the second end of the power pattern 222. The first pad 310 and the second pad 320 may be attached on the first end and the second end of the power pattern 222. The first pad 310 and the second pad 320 are formed to supply power to the first end and the second end of the power pattern 222, and only when the first pad 310 and the second pad 320 are electrically connected to the power pattern 222, their shapes and sizes are not limited.

Additionally, the other side of the first substrate 220 may be bonded to one side of the third substrate 210, on which the wiring pattern 211 is formed, while facing each other. The third substrate 210 is a substrate on which the wiring pattern 211 is formed in a direction perpendicular to the direction of the wiring pattern 210 (→221) formed on the first substrate 220, which becomes a pen touch sensing area of the touch panel, and it is provided together with the first substrate 220 to perform a function of sensitively processing sensing of a pen touch on the touch panel.

Referring to FIG. 6, the second substrate 300 is an FPCB substrate, electrically insulated while selectively exposing the terminal unit 311. The terminal unit 311 may be connected to the first pad 310 and the second pad 320. The first pad 310 and the second pad 320 are respectively connected to the first end and the second end of the power pattern 222 and connected to the power supply driver (PWD) to receive power from the power supply driver (PWD) so that the power pattern 222 may generate electromagnetic force, and the terminal unit 311 functions as the power supply driver (PWD).

As shown in FIG. 5, the first end and the second end of the power pattern 222 are respectively connected to the first pad 310 and the second pad 320, and the power pattern 222 is formed as one line without an overlapped portion. FIGS. 5(a), 5(b) and 5(c) are views schematically showing various embodiments of the power pattern 222. The embodiments of the power pattern 222 are not limited to FIGS. 5(a), 5(b) and 5(c) and may be implemented in a variety of forms when the power pattern 222 is formed as one line without being overlapped and one end and the other end are respectively connected to the first pad 310 and the second pad 320.

The first end of the power pattern 222 may be connected to any point of the first pad 310 when it is connected to the first pad 310, and the second end of the power pattern 222 may be connected to any point of the second pad 320 when it is connected to the second pad 320. While the first end and the second end of the power pattern 222 are respectively connected to the first pad 310 and the second pad 320, the power pattern 222 should be formed as one line to surround the wiring pattern 221 of the first substrate 220 one or more times without an overlapped portion.

FIG. 6 is a perspective view schematically showing a first substrate and a second substrate according to an example embodiment. FIG. 7 is a side view showing the first substrate and the second substrate according to an example embodiment. Other embodiments and configurations may also be provided. As shown in FIGS. 6 and 7, the second substrate 300 is an FPCB substrate, and although it is electrically insulated, the terminal units 311 and 321 are selectively exposed to be electrically connected.

One of the terminal units 311 and 312 is a power terminal, and is a terminal for supplying power to the power pattern 222. The terminal units 311 and 312 are connected to the first pad 310 and the second pad 320, and the first pad 310 and the second pad 320 are respectively connected to the first end and the second end of the power pattern 222 and are connected to the power supply driver (PWD) to receive power needed for generating electromagnetic force by the power pattern 222 from the power supply driver (PWD).

In addition to the first pad 310 and the second pad 320, a third pad 330 may be further provided. The third pad 330 may be formed wider than one end of the wiring pattern 221 and connected to the wiring pattern 221, and an area in which the wiring pattern 221 may be formed is referred to as a sensing area, and the area other than the sensing area may be a bezel area. Additionally, the third pad 330 may be electrically connected to an exposed terminal 331 of another driving circuit or a chip 331 through the second substrate 300.

FIG. 8 is a circuit diagram showing a power pattern according to an example embodiment. For example, as shown in FIG. 8, if wiring patterns 221 are formed on the first substrate and one ends of the wiring patterns 221 are formed at a side of the first substrate to commonly connect the wiring patterns 221, one ends of the wiring patterns 221 are respectively connected to the third pad 330 provided on the first substrate to be electrically connected. The power pattern 222 surrounds the wiring pattern 221 and is formed to surround the wiring pattern 221 at least one or more times at the edge of the first substrate 220, and when the power pattern 222 is formed to surround the wiring pattern 221 at least one or more times, the power pattern 222 is formed as one line without having an overlapped portion by connecting one end to the first pad 310 and the other end to the second pad 320.

The wiring pattern 221 discussed in this disclosure may include every kind of electrode patterned on the substrate. The wiring pattern 221 may include i) a sensing pattern or capacitive sensing pattern formed on the sensing area, and ii) conducting wires connected to the sensing pattern or capacitive sensing pattern formed on the bezel area. At this point, since the second substrate 300 is formed as an FPCB, the terminal units 311 and 321 are selectively exposed (FIG. 6) and are connected to the first pad 310, the second pad 320 and the third pad 330 of the first substrate 220, and portions other than those connected to the first pad 310, the second pad 320 and the third pad 330 are electrically insulated.

The first pad 310, the second pad 320 and the third pad 330 are formed on the first substrate 220 in a straight line since it may be advantageous to manufacture when they are formed in a straight line. That is, although the first pad 310, the second pad 320 and the third pad 330 may not be formed on the first substrate 220 in a straight line, the pads are determined to be formed in a straight line for a convenient manufacturing process.

An object of the present disclosure is not to have a jumping structure in forming a power pattern 222, and only the power pattern 222 may be formed on the first substrate 220, and the wiring pattern 221 may not be formed. At this point, the touch panel may be implemented by forming only the power pattern 222 on the first substrate 220, forming the wiring pattern on another substrate and attaching the another substrate on which the wiring pattern is formed to the first substrate 220. A pad for electrically connecting the wiring pattern of another substrate may also not be formed on the first substrate 220, and an FPCB substrate provided with a pad for electrically connecting the wiring pattern of another substrate is further provided.

As is shown, if the wiring pattern 221 and the power pattern 222 are electrically connected by arranging the first pad 310, the second pad 320 and the third pad 330 on the first substrate 220, the first pad 310, the second pad 320 and the third pad 330 are connected to a driving circuit or an IC chip provided with the driving circuit, to which the wiring pattern 221 and the power pattern 222 are eventually connected, and thus a touch panel having a convenient manufacturing process and a simple structure may be formed.

FIG. 9 is a circuit diagram showing a substrate overlapping area of a touch panel according to an example embodiment. As shown in FIG. 9, a touch panel of the present disclosure includes a first substrate 220 on which a power pattern 222 is formed at the edge of one side of the substrate, a second substrate 300 on which terminal units 311 and 321 electrically connected to the power pattern 222 are arranged (see FIG. 6), and a substrate overlapping area 301 in which the first substrate 220 and the second substrate 300 are overlapped, and some of the power pattern 222 are formed in the substrate overlapping area 301. The shaded portions of FIG. 9 correspond to the substrate overlapping area 301.

That is, the first substrate 220 and the second substrate 300 further have an area 301 in which the first substrate 220 and the second substrate 300 are overlapped, in addition to an area in which the first pad 310 and the second pad 320 are connected to the first end and the second end of the power pattern 222.

The second substrate 300 is an FPCB substrate, and the first substrate 220 has the first pad 310 formed to be electrically connected to the first end of the power pattern 222 and the second pad 320 formed to be electrically connected to the second end of the power pattern 222, and the terminal units 311 and 321 are exposed on the other side of the second substrate 300 and are respectively bonded to the first pad 310 and the second pad 320.

A touch panel according to the present disclosure has been described. The X layer pattern, the Y layer pattern, the wiring pattern, the power coil layer pattern or the power pattern (hereinafter referred to as a pattern) described in the detailed description may include a transparent conductive material so that electricity may flow without hindering transmission of light. For example, the patterns may include a metallic oxide, such as indium tin oxide, indium zinc oxide, copper oxide, tin oxide, zinc oxide, titanium oxide or the like.

On the other hand, patterns may include a nano-wire, a photosensitive nano-wire film, a carbon nano-tube (CNT), graphene, conductive polymer or a mixture of these. When a nano-composite such as a nano-wire or a carbon nano-tube (CNT) is used, the patterns may be configured in black color, and this is advantageous in that the color and reflectivity can be controlled, while securing electric conductivity through content control of nano-powder.

On the other hand, the patterns may include various kinds of metals. For example, the patterns may include at least one of metals, including chrome (Cr), nickel (Ni), copper (Cu), aluminum (Al), silver (Ag), molybdenum (Mo), gold (Au), titanium (Ti) and an alloy of these.

On the other hand, with regard to line width and shape, the patterns such as the X layer pattern, the Y layer pattern, the wiring pattern, the power coil layer pattern, the power pattern and the like may be implemented in a mesh shape as shown in FIG. 10.

More specifically, the patterns may be implemented in a mesh shape by arranging a plurality of sub-electrodes to cross each other. Additionally, the patterns may include mesh lines LA formed by the plurality of sub-electrodes crossing each other in a mesh shape and mesh openings OA formed between the mesh lines.

The width of the mesh line LA may be approximately 0.1 to 10 µm. A mesh line unit of a mesh line LA having a line width of less than 0.1 µm can not be manufactured, or a short-circuit may occur in the mesh line LA, and if the line width exceeds 10 µm, visibility may be lowered since the pattern can be seen from outside. More preferably, the line width of the mesh line LA may be approximately 0.5 to 7 µm. More preferably, the line width of the mesh line LA may be approximately 1 to 3.5 µm.

Additionally, the mesh opening OA may be formed in a variety of shapes. For example, the mesh opening OA may have a variety of shapes such as a polygonal shape including a rectangular shape, a diamond shape, a pentagonal shape and a hexagonal shape, a circular shape and the like. Additionally, the mesh opening OA may be formed in a regular shape or a random shape.

Since the patterns have a mesh shape, the patterns may not be shown in a display area. That is, although the patterns are formed of a metal, it may not be shown to a user. Additionally, even when the patterns are applied to a touch screen of a large size, it has an effect of reducing resistance of the touch window.

Embodiments have an effect of improving the problem of overlapping a power coil in forming the power coil.

Additionally, embodiments have an effect of reducing manufacturing time and manufacturing cost in forming a power coil.

Additionally, embodiments have an effect of manufacturing a touch panel of a simple structure by reducing the number of substrates on which a wiring pattern is formed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel having a power pattern, the touch panel comprising:
    a first substrate having the power pattern, a first pad and a second pad, provided thereon the power pattern provided at edges of a first side of the first substrate at least two or more times, and the power pattern to not overlap another portion of the power pattern from a first end of the power pattern to a second end of the power pattern, the first pad to be electrically connected to the first end of the power pattern, and the second pad to be electrically connected to the second end of the power pattern;
a second substrate having a first terminal unit provided thereon to electrically connect to the first pad, and the second substrate having a second terminal unit provided thereon to electrically connect to the second pad; and
a substrate overlapping area,
wherein the first substrate and the second substrate are overlapped,
wherein at least a portion of the power pattern is at the substrate overlapping area,
wherein the first side of the first substrate is bonded to a first side of the second substrate while the first side of the first substrate faces the first side of the second substrate,
wherein a wiring pattern is on the first substrate, and the power pattern to surround the wiring pattern at least two or more times as one line without having an overlapped portion by connecting a first end of the power pattern to the first pad and a second end of the power pattern to the second pad,
wherein the portion of the power pattern formed at the substrate overlapping area is a portion formed by surrounding the wiring pattern at least two or more times at the edge of the first side of the first substrate, in addition to the portion of the power pattern where the first pad and the second pad are connected to the first end and the second end of the power pattern,
wherein a plurality of third pads are provided on the first substrate, between the first ad and the second pad, and each of the third pads is electrically connected to one side of the wiring pattern,
wherein the first pad, the second pad and the plurality of third pads are aligned in a straight line on the first substrate,
wherein a plurality of third terminal units are provided on the second substrate to electrically connect to the plurality of third pads on the first substrate, and
wherein the first terminal unit, the second terminal unit and the plurality of third terminal units are aligned in a straight line on the second substrate.

2. The touch panel according to claim 1, wherein the second substrate is a flexible printed circuit board (FPCB) substrate.

3. The touch panel according to claim 2, wherein the first side of the first substrate is bonded to the first side of the second substrate by Anisotropic Conductive Film (ACF) bonding.

4. The touch panel according to claim 1, wherein the first and second terminal units on the second substrate are exposed on the first side of the second substrate.

5. The touch panel according to claim 4, wherein the first side of the first substrate is bonded to the first side of the second substrate by Anisotropic Conductive Film (ACF) bonding.

6. The touch panel according to claim 1, wherein a second side of the first substrate is bonded to a first side of a third substrate, on which a wiring pattern is formed, and the second side of the first substrate is facing the first side of the third substrate.

7. The touch panel according to claim 1, wherein a material of the power pattern is a metallic oxide, such as Indium Tin Oxide (ITO), Indium Zinc Oxide (IZO), Zinc Oxide (ZnO), Copper Oxide, Tin Oxide, Zinc Oxide, Titanium Oxide or the like, a nano-wire, a photosensitive nano-wire film, a carbon nano-tube (CNT), conductive polymer, graphene, copper (Cu), gold (Au), silver (Ag), aluminum (Al), titanium (Ti), or nickel (Ni).

8. A touch panel having a power pattern, the touch panel comprising:
a first substrate having the power pattern at edges of a first side of the first substrate, wherein the power pattern is provided at the edge at least two times, wherein a first pad and a second pad are at the first substrate;
a second substrate having terminal units to be electrically connected to the power pattern, wherein a first terminal unit is bonded to the first pad, and a second terminal unit is bonded to the second pad; and
a substrate overlapping area,
wherein the first substrate and the second substrate are overlapped,
wherein at least a portion of the power pattern is at the substrate overlapping area,
wherein the first side of the first substrate is bonded to a first side of the second substrate while the first side of the first substrate faces the first side of the second substrate,
wherein a wiring pattern is on the first substrate, and the power pattern to surround the wiring pattern on the first substrate at least two or more times as one line without having an overlapped portion by connecting a first end of the power pattern to the first pad and a second end of the power pattern to the second pad,
wherein the portion of the power pattern formed at the substrate overlapping area is a portion formed by surrounding the wiring pattern at least two or more times at the edge of the first side of the first substrate, in addition to the portion where the first pad and the second pad are connected to the first end and the second end of the power pattern,
wherein a plurality of third pads are provided on the first substrate, between the first pad and the second pad, and each of the third pads is electrically connected to one side of the wiring pattern,
wherein the first pad, the second pad and the plurality of third pads are aligned in a straight line on the first substrate,
wherein a plurality of third terminal units are provided on the second substrate to electrically connect to the plurality of third pads on the first substrate, and
wherein the first terminal unit, the second terminal unit and the plurality of third terminal units are aligned in a straight line on the second substrate.

9. The touch panel according to claim 8, wherein the second substrate is a flexible printed circuit board (FPCB) substrate.

10. The touch panel according to claim 9, wherein the first pad and the second pad are at the first substrate, the first pad is electrically connected to a first end of the power pattern and the second pad is electrically connected to a second end of the power pattern, and the first and second terminal units are exposed on the first side of the second substrate, and the first terminal unit is bonded to at least the first pad, and the second terminal unit is bonded to at least the second pad.

11. The touch panel according to claim 8, wherein a material of the power pattern is metallic oxide, such as Indium Tin Oxide (ITO), Indium Zinc Oxide (IZO), Zinc Oxide (ZnO), Copper Oxide, Tin Oxide, Zinc Oxide, Titanium Oxide or the like, a nano-wire, a photosensitive nano-wire film, a carbon nano-tube (CNT), conductive polymer, graphene, copper (Cu), gold (Au), silver (Ag), aluminum (Al), titanium (Ti), or nickel (Ni).

\* \* \* \* \*